(12) United States Patent
Huff et al.

(10) Patent No.: US 11,241,974 B2
(45) Date of Patent: Feb. 8, 2022

(54) INTERCHANGEABLE ENERGY DEVICE FOR ELECTRIC VEHICLE

(71) Applicant: Artisan Vehicle Systems, Inc., Camarillo, CA (US)

(72) Inventors: Brian R. Huff, Newbury Park, CA (US); Kyle Hickey, Moorpark, CA (US)

(73) Assignee: ARTISAN VEHICLE SYSTEMS, INC., Camarillo, CA (US)

( * ) Notice: Subject to any disclaimer, the term of this patent is extended or adjusted under 35 U.S.C. 154(b) by 0 days.

(21) Appl. No.: 16/839,336

(22) Filed: Apr. 3, 2020

(65) Prior Publication Data

US 2020/0317082 A1 Oct. 8, 2020

Related U.S. Application Data

(60) Provisional application No. 62/828,963, filed on Apr. 3, 2019.

(51) Int. Cl.
| | |
|---|---|
| *B60L 53/80* | (2019.01) |
| *B60L 50/60* | (2019.01) |
| *H01M 10/42* | (2006.01) |
| *B60L 50/40* | (2019.01) |
| *B60L 50/10* | (2019.01) |
| *H01M 50/20* | (2021.01) |

(52) U.S. Cl.
CPC .............. *B60L 53/80* (2019.02); *B60L 50/10* (2019.02); *B60L 50/40* (2019.02); *B60L 50/66* (2019.02); *H01M 10/4264* (2013.01); *H01M 50/20* (2021.01); *H01M 2220/20* (2013.01)

(58) Field of Classification Search
CPC .......... B60L 53/80; B60L 50/66; B60L 50/10; B60L 50/40; B60L 50/60; H01M 50/20; H01M 10/4264; H01M 2220/20; H01M 10/42
See application file for complete search history.

(56) References Cited

U.S. PATENT DOCUMENTS

| | | | |
|---|---|---|---|
| 4,397,365 | A | 8/1983 | Harbe et al. |
| 5,297,661 | A | 3/1994 | Tschurbanoff |
| (Continued) | | | |

FOREIGN PATENT DOCUMENTS

| | | |
|---|---|---|
| JP | 10-035297 A | 2/1998 |
| WO | 1999-54158 A1 | 10/1999 |

OTHER PUBLICATIONS

International Search Report dated Jul. 21, 2021, PCT/US2020/026629, filed Apr. 3, 2020 (3 pp).

(Continued)

*Primary Examiner* — Robert L Deberadinis
(74) *Attorney, Agent, or Firm* — Plumsea Law Group, LLC

(57) ABSTRACT

An interchange energy device for an electric vehicle enables an electric vehicle to be compatible with existing power lines such as overhead catenary system with little to no modification necessary to a modern electric vehicle. The interchangeable energy device has the same form factor as a battery pack, and is fully compatible with the drive system of the vehicle. The interchangeable device enables a battery pack to be swapped for an adapter to take advantage of existing power systems such as an overhead catenary system.

18 Claims, 3 Drawing Sheets

(56) References Cited

U.S. PATENT DOCUMENTS

| | | | |
|---|---|---|---|
| 8,981,727 B2* | 3/2015 | Kusch | B60L 15/007 320/134 |
| 2015/0071747 A1 | 3/2015 | Deahl et al. | |
| 2019/0061544 A1* | 2/2019 | Jansen | B60S 5/06 |

OTHER PUBLICATIONS

Written Opinion of the International Search Report dated Jul. 21, 2021, PCT/US2020/026629, filed Apr. 3, 2020 (4 pp).

* cited by examiner

INTERCHANGEABLE ENERGY DEVICE FOR ELECTRIC VEHICLE

REFERENCE TO RELATED APPLICATION

This application claims priority to provisional application No. 62/828,963 filed on Apr. 3, 2019.

BACKGROUND OF THE INVENTION

1. Field of the Invention

The present disclosure relates broadly to electric vehicles, and more specifically to electric vehicles used in subsurface mines.

2. Description of Related Art

Co-pending and commonly owned U.S. application Ser. No. 15/908,802 filed on Feb. 28, 2018, describes a method and system for mounting and dismounting batteries from an electric vehicle, and swapping one battery for another. The contents of U.S. application Ser. No. 15/908,802, was made a part of the provisional application, and is also hereby incorporated by reference in its entirety In vehicles powered solely and at least partially with electricity, the sources of electricity may be from a fuel engine, a hybrid system, or a fully electric drive system powered by a battery. In the subsurface mining environment, advances in electric and clean energy alternatives to traditional diesel machines require adaptability as mine operators transition from traditional diesel machines or trolley powered electric machines. While fully electric machines become more available with on-board energy sources in the form of heavy duty battery packs, in some applications, it would be even more advantageous to be able to provide interchangeable energy sources for the electric machines.

SUMMARY OF THE INVENTION

Various embodiments of an electric vehicle are disclosed. The embodiments describe electric mining vehicles which can be battery powered or powered by a conventional trolley system with electrified catenary cables or rails supplied in a subsurface mine. The interchangeable device may be another battery, or an adapter of sorts that enables the vehicle to be powered by the trolley system. The concept being to provide an interchangeable energy device that may be another battery, another type of battery, a generator, a fuel engine, a trolley system adapter, or another type of energy source or adapter for another type of energy. The interchangeable device would be sized and configured to be compatible with the battery packs supplied for the particular type of electric vehicle and the vehicle drive system so that the energy source for the vehicle can be easily changed and swappable.

The vehicle and battery mounting and dismounting method are described in application Ser. No. 15/908,802. The current disclosure contemplates the use of a different type of energy source or adaptor for an energy source that has a compatible form factor with the battery pack and the drive system of the machine. With respect to the term "form factor," application Ser. No. 15/908,802 defines this term with respect to the overall dimensions of a vehicle as a whole. For purposes of this disclosure, the term "form factor" shall have substantially the same meaning with respect to the energy source or adaptor for an energy source. That is, the "form factor" of an energy source or adapter shall refer to the overall length, overall width, and overall height of the component, as well as other dimensions. In other words, a battery pack and catenary cable adaptor that share the same form factor both fit within the confines of the same recess, receptacle, or other receiving portion of a vehicle. Due at least in part to this common form factor, the disclosed energy sources and adapters are interchangeable with one another in terms of fitment and attachment to the vehicle. In the language of application Ser. No. 15/908,802, a primary battery assembly may be supplied as an on-board energy source for the vehicle, or more broadly, machine.

Any of the various types of energy sources are contemplated, with the compatible form factor and functionality providing a range of options for operators to provide a suitable set of energy devices for any given electric machine operation.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The electric vehicles are may be supplied with on-board energy devices such as battery packs which enable free movement of the vehicles. In some conventional subsurface mines, electric vehicles are powered by a wired connection such as a catenary line or a conductive rail of a track or the like.

Figure 1:
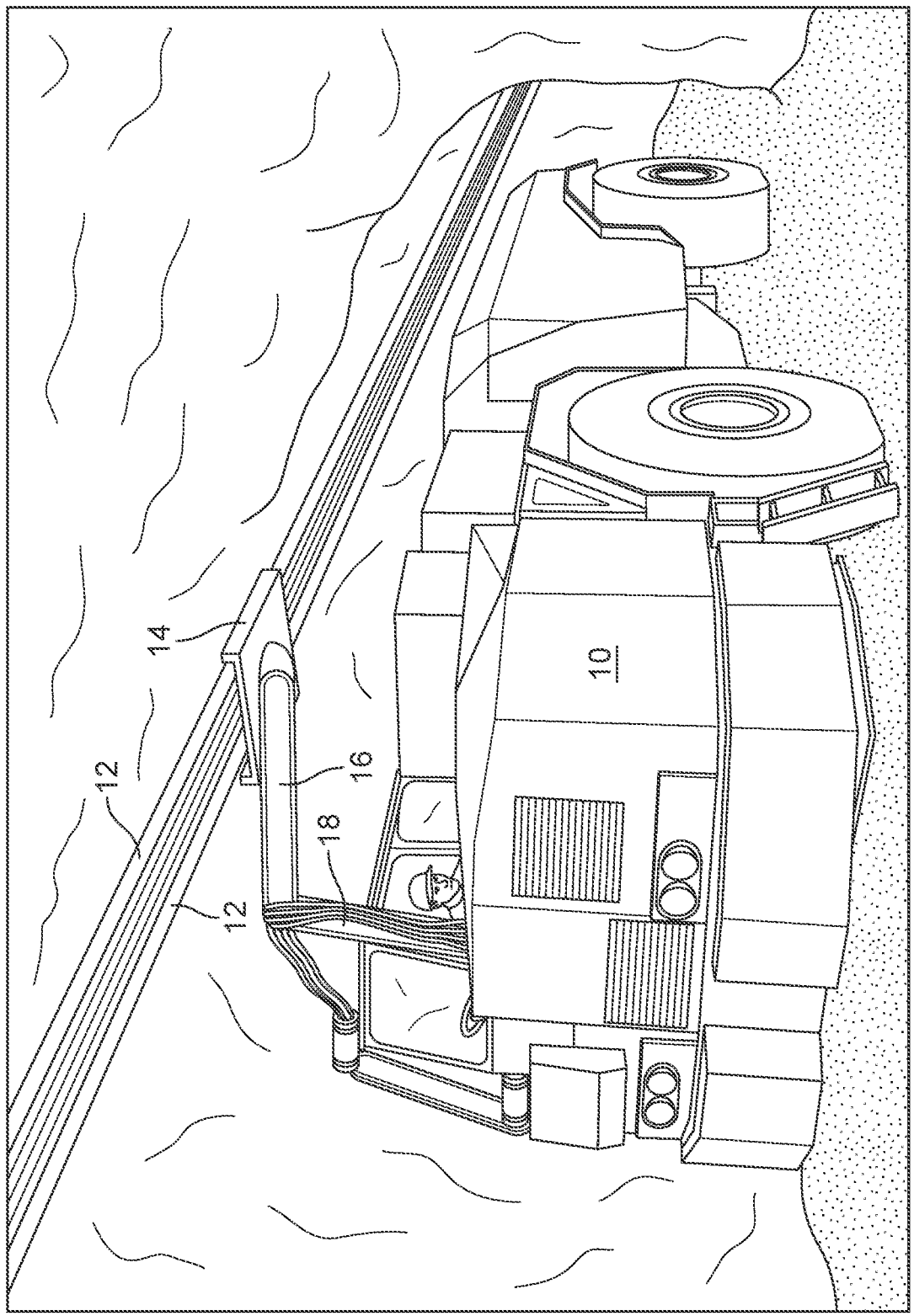
FIG. 1 is a perspective view of a subsurface mining machine powered by overhead electrified catenary cables or rails.

The vehicle 10 shown in FIG. 1 is a conventional electric vehicle that is powered by a catenary lines or rails 12 via contact between contact shoes 14 at the ends of trolley poles 16 connected to the top surface of the vehicle with a trolley pole base 18.

Figure 2:
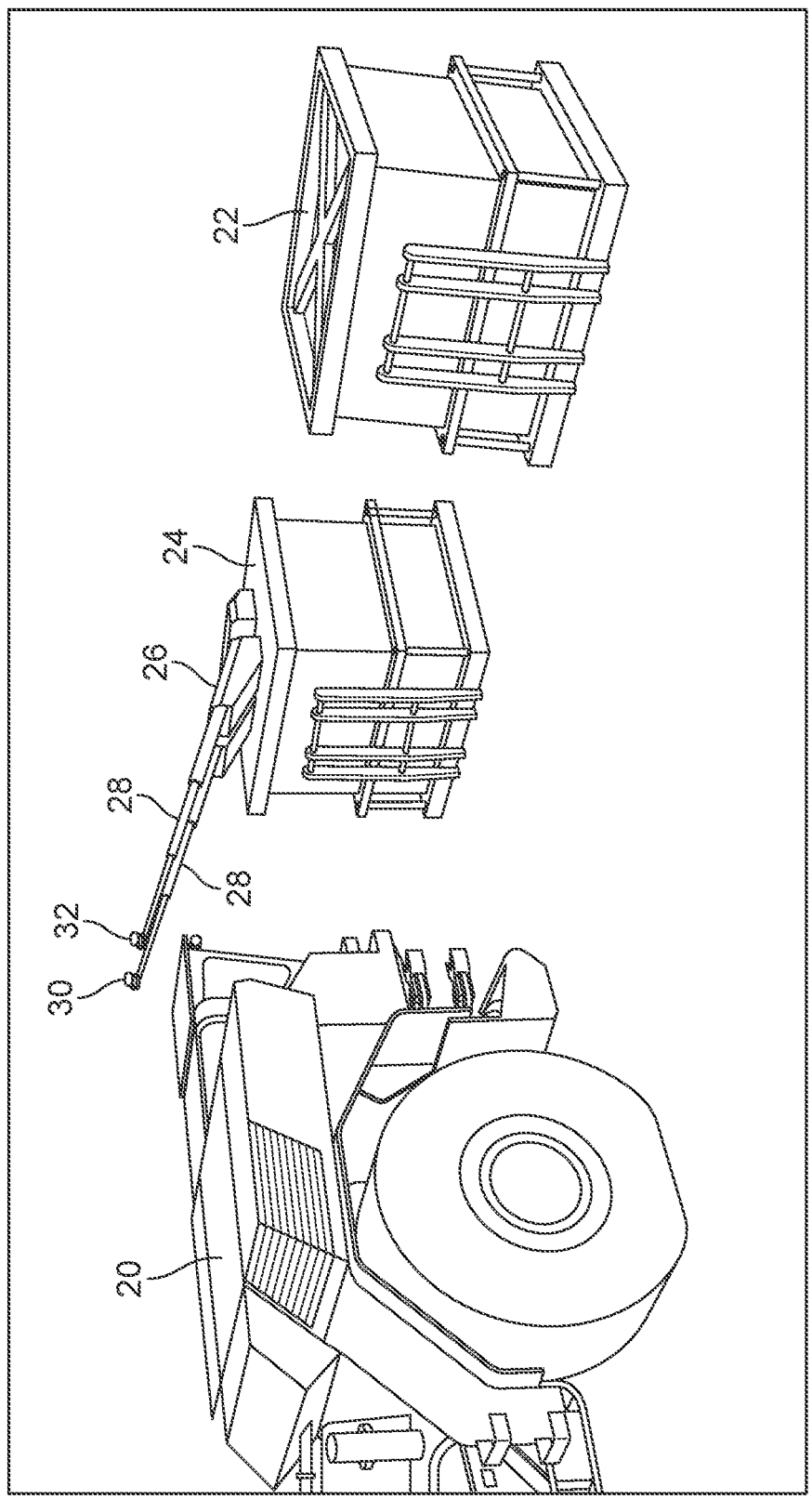
FIG. 2 is a schematic view of a portion of a machine shown with two interchangeable energy devices, illustrated with both devices off-board of the machine.
Figure 3:
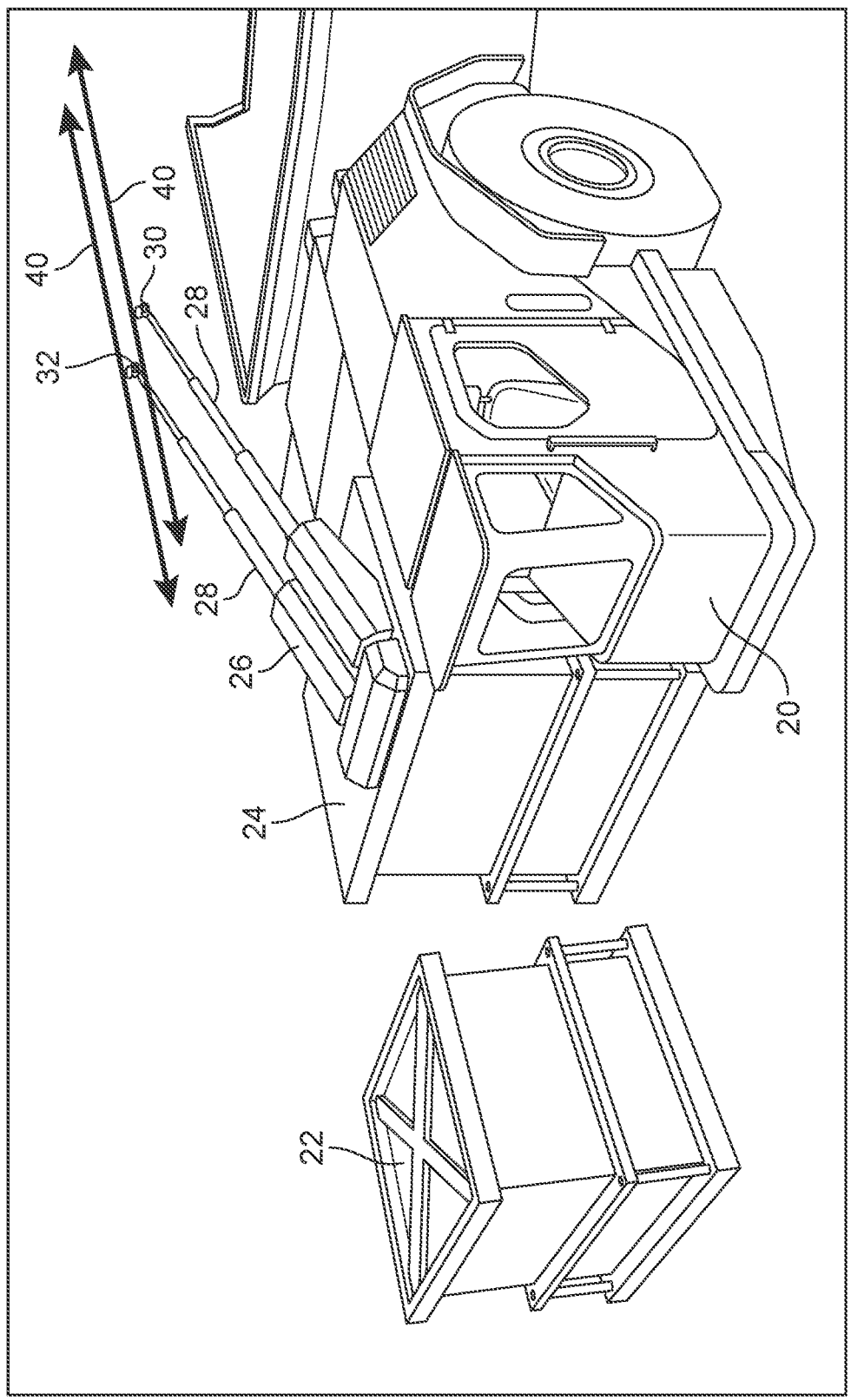
FIG. 3 is a schematic view of a portion of a machine shown with one interchangeable energy device mounted on the platform and another interchangeable energy device shown off-board.

In some subsurface mines, catenary lines are installed and powered. To enable modern electric vehicles to be employed in existing mines, an interchangeable energy device is provided that enables newer vehicles to be backwards compatible with existing mines having trolley system infrastructure. FIGS. 2 and 3 illustrate conceptually electric vehicles and battery packs as may be used in a subsurface mine. Referring to FIG. 2, only a portion of vehicle 20 is illustrated, the portion having the battery mounting platform, in this exemplary embodiment, next to the operator cab. Vehicle 20 may have an auxiliary battery on-board to power it during energy source swapping operations, or to move between battery charging areas, or the like. In FIG. 2, a battery 22 is illustrated and may be the type of battery pack described in application Ser. No. 15/908,802. Also shown in FIG. 2 is an interchangeable energy device 24, which has the same form factor as battery 22. As used herein, both battery 22 and energy device 24 are interchangeable energy devices. Energy device 24 functions as an adapter for powering vehicle 20 using an existing trolley system (FIG. 1). Therefore, energy device 24, while having the same form factor as battery 22, includes a trolley pole base 26, trolley poles 28 and contact shoes 30 and 32. The form factor for device 24 is identical to that of the battery. In addition, device 22 is fully compatible with the battery mounting hardware on vehicle 20 as well as the drive system of vehicle 20.

FIG. 3 illustrates vehicle 20 shown with the interchangeable energy device 24 mounted on the vehicle and battery 22 off-loaded from the vehicle. A full description of the method of swapping these components can be found in application Ser. No. 15/908,802. Overhead cables or catenary rails 40 are illustrated schematically in contact with contact shoes 30 and 32 of the energy device. In this fashion, it can be seen that an interchangeable energy device can be employed to make vehicle 20 compatible with an existing overhead catenary system (OCS). In some environments, it is possible that the OCS is discontinuous in which case the auxiliary battery of the vehicle may be employed to power the vehicle from one section of the OCS to another section of the OCS. The auxiliary battery also powers the energy source mounting and dismounting operation described in application Ser. No. 15/908,802.

The interchangeable device enables a vehicle with little to no modifications to operate in either an existing OCS system or a new environment in which on-board power (e.g., a battery pack) will be employed. The system enables the machine to pick up a trolley device as needed to swap energy sources as necessitated by the operating conditions. This provides needed flexibility for the vehicle fleet or mine operator to ensure the system is forward and backward compatible.

It will be understood that variations on the energy sources are possible within the scope of this concept. That is the interchangeable energy device may be a battery, a different type of battery, a generator, a fuel engine, or an adaptor for any existing energy infrastructure. It will also be understood that the system may be employed with any combination of devices, such as batteries, adapters and the like.

It will also be understood that the energy source is compatible with and in communication with the drive system and drive controller. The energy source, whether battery or trolley adapter, or another type of source would be compatible with the drive system and controller.

As described herein, the OCS, overhead catenary system or rail may involve options for off-wire operation such as ground level power supply or on-board energy storage systems. While on-board power generation is a third option that has received less research, this may change with hydrogen fuel cell technology. Any combination of energy systems are also contemplated to within the scope of this disclosure.

Ground level power supply can be contact or contactless. Contact ground level power supply essentially employs an embedded third rail as is typically used in subway systems and was used on some early streetcar systems. Much improved versions of this technology may offer advantages in challenging environments that have heavy loads from heating or cooling needs or the need to traverse steep inclines, all of which can quickly drain a stored power system.

Another type of infrastructure which may pre-exist is contactless ground level power supply using induction coils to power the vehicle. Typically this power transfer takes place only when the vehicle is directly above the coils, and the range of such a system may be extended by combining it with an on-board power storage, so that the coils do not need to be present along the entire length of the system.

On-board energy storage offers an alternative or complement to ground level power supply. Storage mechanisms include batteries, capacitors, flywheels and in some cases, reclaiming kinetic energy from braking to increase system efficiency. A system in which the vehicle runs off wire for a limited segment can often recharge onboard power as the vehicle runs on a wired segment. Longer spans of off wire operation may require a recharging station approach, which can be attained by sufficient dwell time at a stop. For example, in some streetcar systems, a programed dwell time of contact at a station is sufficient to recharge the roof-mounted supercapacitors, thus charging in a short amount of time that is customary for its duty cycle.

In general, as used herein, "electric vehicle" refers to a vehicle that uses electrical power for propulsion purposes, at least in one mode of operation. Thus, electric vehicles include all-electric vehicles (e.g., a vehicle with a traction motor and only an onboard electrical energy storage device or mechanism for receiving electric energy from an off-board source, such as an overhead catenary or powered rail), hybrid-electric vehicles (e.g., a vehicle with a traction motor, an energy storage device, hydraulic propulsion, and a fuel engine, fuel cell, or the like for charging the energy storage device and/or directly generating power for running the traction motor), dual-mode vehicles (e.g., a vehicle with an engine-only mode of operation and an electricity-only mode of operation, or a vehicle with a first mode of operation where traction electricity is provided by an engine and a second mode of operation where traction electricity is provided by another source), diesel-electric and other engine-electric vehicles (e.g., a vehicle with an engine that generates electrical power for running a traction motor), and combinations and variants thereof. Electric vehicles may have one traction motor, or plural traction motors; "traction motor" refers to a motor of sufficient size and capacity to move a vehicle of sufficient size for the designated operation.

Also, the vehicle interface equipment of the wayside stations may comprise: "plug in" modules, e.g., the vehicle plugs into a receptacle of the wayside station, for receiving electrical power from the station; a continuous power interface by which a vehicle can receive off-board power while moving, such as the aforementioned catenary line or third rail; or the like.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for supplying energy to an electric vehicle comprising:
   an electric vehicle with an energy device mounting and dismounting platform;

a first interchangeable energy device configured to be removably mounted on said platform of said vehicle and adapted to power a drive system of said vehicle;

a second interchangeable energy device configured to be removably mounted on said platform of said vehicle, said device being an adapter for supplying power to a drive system of said vehicle; and an auxiliary battery disposed on said vehicle to provide power for mounting or dismounting one of said first or second interchangeable energy devices.

2. The system of claim 1, wherein said auxiliary battery powers said vehicle when first and second interchangeable energy devices are disconnected.

3. The system of claim 1, wherein said first interchangeable energy device is a battery pack to provide on-board stored energy.

4. The system of claim 1, wherein said adapter is a trolley system adapter to provide off-board energy.

5. The system of claim 1, wherein said first interchangeable energy device is a generator.

6. The system of claim 1, wherein said first interchangeable energy device is a supercapacitor.

7. An electric vehicle including an electrical power supply system, comprising:

an energy device mounting and dismounting platform;

a first interchangeable energy device configured to be removably mounted on the platform of the vehicle and adapted to power a drive system of the vehicle; and a second interchangeable energy device that is interchangeable with the first interchangeable energy device, configured to be removably mounted on the platform of the vehicle, said second interchangeable energy device being an adapter supplying power to the drive system of the vehicle;

wherein the second interchangeable energy device implements a different type of power source than the first interchangeable energy device.

8. The vehicle of claim 7, further including an auxiliary battery disposed on the vehicle and configured to provide power for mounting or dismounting at least one of the first and second interchangeable energy devices.

9. The vehicle of claim 8, wherein the auxiliary battery is configured to power the drive system of the vehicle when the first interchangeable energy device and the second interchangeable energy device are disconnected.

10. The vehicle of claim 7, wherein the first interchangeable energy device is a battery pack configured to provide on-board stored energy to power the drive system of the electric vehicle.

11. The vehicle of claim 10, wherein said adapter is a trolley system adapter configured to provide off-board energy to the drive system of the electric vehicle.

12. The vehicle of claim 10, wherein the first interchangeable energy device is a generator.

13. The vehicle of claim 10, wherein the first interchangeable energy device is a supercapacitor.

14. An electrical power supply system for an electric vehicle, the system comprising:

a first interchangeable energy device configured to be removably mounted on an energy device mounting platform of the electric vehicle and adapted to power a drive system of the vehicle; and a second interchangeable energy device that is interchangeable with the first interchangeable energy device, configured to be removably mounted on the same mounting platform of the electric vehicle, said second interchangeable energy device being an adapter supplying power to the drive system of the electric vehicle;

wherein the second interchangeable energy device implements a different type of power source than the first interchangeable energy device.

15. The system of claim 14, wherein the first interchangeable energy device is a battery pack configured to provide on-board stored energy to power the drive system of the electric vehicle.

16. The system of claim 15, wherein said adapter is a trolley system adapter configured to provide off-board energy to the drive system of the electric vehicle.

17. The system of claim 15, wherein the first interchangeable energy device is a generator.

18. The system of claim 15, wherein the first interchangeable energy device is a supercapacitor.

* * * * *